(12) United States Patent
Starr et al.

(10) Patent No.: US 8,504,848 B2
(45) Date of Patent: *Aug. 6, 2013

(54) ENCRYPTED COMMUNICATION DEVICE WITH LIMITED NUMBER OF ENCRYPTION KEY RETRIEVALS FROM MEMORY

(75) Inventors: Matthew Raymond Starr, Balmain (AU); Stephen Cameron Price-White, Balmain (AU)

(73) Assignee: Zamtec Ltd, Dublin (IE)

( * ) Notice: Subject to any disclaimer, the term of this patent is extended or adjusted under 35 U.S.C. 154(b) by 298 days.

This patent is subject to a terminal disclaimer.

(21) Appl. No.: 12/885,574

(22) Filed: Sep. 20, 2010

(65) Prior Publication Data

US 2011/0078456 A1    Mar. 31, 2011

Related U.S. Application Data

(60) Provisional application No. 61/246,531, filed on Sep. 29, 2009.

(51) Int. Cl.
G06F 11/30 (2006.01)

(52) U.S. Cl.
USPC ............................................ 713/193; 380/277

(58) Field of Classification Search
USPC ................... 713/193, 150, 170, 176; 380/277
See application file for complete search history.

(56) References Cited

U.S. PATENT DOCUMENTS

2003/0194086 A1* 10/2003 Lambert .......................... 380/44
2007/0242123 A1* 10/2007 Silverbrook et al. .......... 347/104
2009/0300735 A1* 12/2009 Wiesinger .......................... 726/5

FOREIGN PATENT DOCUMENTS

GB            2421407 A   *  6/2006

* cited by examiner

*Primary Examiner* — Tonia L Dollinger
*Assistant Examiner* — Davoud Zand
(74) *Attorney, Agent, or Firm* — Cooley LLP

(57) ABSTRACT

A device for encrypted communication with external entities is configured to frustrate side channel attacks attempting to determine an encryption key. The device has a first memory, an encryption key stored in the first memory and a one-way function for application to the encryption key. During use, the encryption key is retrieved from the first memory prior to application to the one-way function and the device is configured to limit the number of times the encryption key is allowed to be retrieved from the non-volatile memory to a pre-determined threshold.

17 Claims, 8 Drawing Sheets

ENCRYPTED COMMUNICATION DEVICE WITH LIMITED NUMBER OF ENCRYPTION KEY RETRIEVALS FROM MEMORY

FIELD OF THE INVENTION

The present invention relates to the field of secure communication. The invention has been developed primarily to enable communication between various integrated circuits in a printer, including cartridges for use with the printer, and will be described with reference to this application. However, it will be appreciated that the invention has broad application in the general field, including use in software, hardware and combinations of the two.

CO-PENDING APPLICATIONS

Various methods, systems and apparatus relating to the present invention are disclosed in the following co-pending applications filed by the applicant or assignee of the present invention simultaneously with the present application:
PLT096US PLT097US PLT098US PLT099US PLT100US The disclosures of these co-pending applications are incorporated herein by cross-reference.

RELATED SYSTEMS, METHODS AND DEVICES

Various methods, systems and apparatus relating to the present invention are disclosed in the following co-pending applications filed by the applicant or assignee of the present invention. The disclosures of all of these co-pending applications are incorporated herein by cross-reference.

| | | | | |
|---|---|---|---|---|
| 7,249,108 | 6,566,858 | 6,331,946 | 6,246,970 | 6,442,525 |
| 09/517,384 | 09/505,951 | 6,374,354 | 7,246,098 | 6,816,968 |
| 6,757,832 | 6,334,190 | 6,745,331 | 7,249,109 | 10/636,263 |
| 10/636,283 | 10/407,212 | 7,252,366 | 10/683,064 | 10/683,041 |
| 10/727,181 | 10/727,162 | 10/727,163 | 10/727,245 | 7,121,639 |
| 7,165,824 | 7,152,942 | 10/727,157 | 7,181,572 | 7,096,137 |
| 10/727,257 | 7,278,034 | 7,188,282 | 10/727,159 | 10/727,180 |
| 10/727,179 | 10/727,192 | 10/727,274 | 10/727,164 | 10/727,161 |
| 10/727,198 | 10/727,158 | 10/754,536 | 10/754,938 | 10/727,227 |
| 10/727,160 | 6,795,215 | 6,859,289 | 6,977,751 | 6,398,332 |
| 6,394,573 | 6,622,923 | 6,747,760 | 6,921,144 | 10/780,624 |
| 7,194,629 | 10/791,792 | 7,182,267 | 7,025,279 | 6,857,571 |
| 6,817,539 | 6,830,198 | 6,992,791 | 7,038,809 | 6,980,323 |
| 7,148,992 | 7,139,091 | 6,947,173 | | |

BACKGROUND OF THE INVENTION

Manufacturers of systems that require consumables (such as laser printers that require toner cartridges) have addressed the problem of authenticating consumables with varying levels of success. Most have resorted to specialized packaging that involves a patent. However this does not stop home refill operations or clone manufacture in countries with weak industrial property protection. The prevention of copying is important to prevent poorly manufactured substitute consumables from damaging the base system. For example, poorly filtered ink may clog print nozzles in an ink jet printer, causing the consumer to blame the system manufacturer and not admit the use of non-authorized consumables.

In addition, some systems have operating parameters that may be governed by a license. For example, while a specific printer hardware setup might be capable of printing continuously, the license for use may only authorize a particular print rate. The printing system would ideally be able to access and update the operating parameters in a secure, authenticated way, knowing that the user could not subvert the license agreement.

Furthermore, legislation in certain countries requires consumables to be reusable. This slightly complicates matters in that refilling must be possible, but not via unauthorized home refill or clone refill means. To authenticate 'genuine' consumables, communications between the consumable and the printer can be authenticated with digital signatures. To create a digital signature, the data to be signed (d) is passed together with a secret key (k) through a key dependent one-way hash function (SIG). i.e. signature=$SIG_k(d)$. One of the most popular key dependent one-way hash function used today is HMAC-SHA1 (Hash Message Authentication Code—Secure Hash Algorithm No. 1), although any key dependent one-way hash function could be used.

Consumables such as ink cartridges can have quality assurance integrated circuit devices, or QA chips as they are known, which authenticate the ink cartridge to a corresponding QA chip in the printer before the ink is accepted. The cartridge QA chip stores a secret key and generates a digital signature that the printer QA chip validates before accepting the cartridge.

A comprehensive description of digital encryption, and the use of encryption keys within the Memjet printing system, is provided in U.S. Pat. No. 7,557,941 entitled "Use of Base and Variant Keys with Three or more Entities". The entire content of U.S. Pat. No. 7,557,941 is incorporated herein by cross reference.

To manufacture clone consumables, the authentication process must be subverted. The clone consumable must generate a digital signature that the printer will validate. This requires the secret key stored in the cartridge. The QA chip may be 'attacked' in an effort to decrypt the key. One category of attacks is known as side channel attacks. These attacks exploit information 'leaked' from the chip during operation. The power consumption, the emitted electro-magnetic radiation and other externally observable fluctuations can provide information about the operations of the chip.

One particular type of side-channel attack is the differential power analysis attack (or DPA attack) which focuses on the power consumption of the chip. The power consumption is easily measurable and indicates the number of changes in state for the various logic components. Typically, correct bits within the signature cause many logic states to change and so the power spikes. Recording and analysing many (say 100 to 1000) traces of the power consumption in response to messages sent by the attacker can reveal the secret key. In light of this, DPA attacks are particularly inexpensive and practical.

Once in possession of the secret key, clone cartridges are indistinguishable from the attacked authorized cartridge. All printers that accept the authorized cartridge will now also accept the clones. It is desirable to have a QA device with a DPA defence that frustrates an attacker or reduces the harm caused encryption keys are successfully acquired.

SUMMARY OF THE INVENTION

According to a first aspect, the present invention provides a device for encrypted communication with external entities, the device comprising:
a first memory;
an encryption key stored in the first memory; and,
a one-way function for application to the encryption key;
wherein during use, the encryption key is retrieved from the first memory prior to application to the one-way function and the device is configured to limit the number of times the encryption key is allowed to be retrieved from the first memory to a pre-determined threshold.

Preferably, the encryption key is a base key and the first memory is a non-volatile memory. Optionally, the encryption key is a batch key used for securing an initial configuration procedure of the device.

A DPA attack needs a certain number of power traces during retrieval and use of the base key in order to deduce its identity. By limiting the number of times that the base key can be accessed, an attacker has insufficient information to analyse and determine the base key.

Preferably, the device is configured to generate a first variant key based on the one-way function, the base key and unique information from a first external entity, the first variant key being stored for generating a digital signature to authenticate communications between the device and the first external entity.

The first variant key is retrieved and used to generate a digital signature for every communication with the first external entity. A DPA attack can acquire a sufficient number of power traces to analyse the first variant key, but as this key will only authenticate communication with the first external entity, it is of little value to the attacker. Clone cartridges using this key will work with one printer only.

Preferably, the device further comprises a rewritable memory for storing the first variant key, the rewritable memory having capacity to store a predetermined number of variant keys generated using the base key, the predetermined number of variant keys being less than the threshold number of times that the base key can be retrieved from the non-volatile memory.

A user may legitimately want to share an ink cartridge between two or three printers. The cartridge will need to retrieve the base key from non-volatile memory at least three times to generate the variant keys for the respective printers. However if the cache memory can store three variant keys, the QA chip will not reach the base key retrieval limit if the cartridge is swapped between the user's printers numerous times. A DPA attacker can potentially determine all three variant keys, but this still only limits any clone cartridge to use with three printers which is not commercially worthwhile.

Preferably, the generation of each of the variant keys using the one-way function is a calculation that has several separate terms, and the device is configured to use random arrangements of the terms. This frustrates the attacker by making it harder to combine multiple power consumption waveforms to reduce noise.

Optionally, the generation of each of the variant keys using the one-way function is a calculation that has several separate terms, and the device is configured to provide an arrangement of the terms that differs from other like devices.

Preferably, the device further comprises a set of masking numbers, wherein during use, the generation of each of the variant keys using the one-way function is a calculation that has several separate terms and at least one of the masking numbers of added as an additional term, and subsequently subtracted from the result of the calculation. A set of masking numbers is unpredictable to the attacker and it will change the power consumption waveform but not affect the final cryptographic result.

Optionally, the masking numbers are randomly generated for the generation of each of the variant keys.

Preferably, the device disallows the base key to be retrieved for generating a digital signature. In a further preferred form, the base key can be retrieved only for generating a variant key.

Preferably, the device further comprises resource data wherein the first external entity has certain permissions in relation to operations on the resource data.

Optionally the resource data represents a physical property.

Optionally the physical property is a remaining amount of a physical resource.

Optionally the resource is a consumable resource.

Optionally the resource entity is physically attached to a reservoir or magazine that holds the consumable resource.

Optionally the resource is a fluid.

Optionally the fluid is ink.

Optionally the operation includes a read, in which the resource data is read by the first external entity.

Optionally the operation includes write, in which the resource data is modified by the entity making the request.

Optionally the operation includes decrementing, in which the resource is decremented by the entity making the request.

Optionally the one way function is a hash function.

Optionally the one way function is SHA1.

According to a second aspect, the present invention provides a device for encrypted communication with external entities, the device comprising:
a first memory;
an encryption key stored in the first memory; and,
a one-way function for application to the encryption key;
wherein during use,
the encryption key is retrieved from the first memory prior to application to the one-way function and the device is configured to limit the number of times the encryption key is allowed to be retrieved from the first memory in a given period of time.

Preferably, the encryption key is a base key and the first memory is a non-volatile memory. Optionally, the encryption key is a batch key used for securing an initial configuration procedure of the device.

In this aspect, legitimate users can swap a cartridge between printers an unlimited number of times, as long as it is not too frequent. However, the DPA attacker would find the retrieval frequency limit too frustratingly slow for gaining the many power traces needed to successfully deduce the encryption key.

According to a third aspect, the present invention provides a system for encrypted communication between entities, the system comprising:
a device with an encryption key stored in memory;
an external entity with identity data for transmission to the device to initiate communication such that in response the device applies a one way function to the encryption key and the identity data to generate a variant key used to authenticate communications between the device and the external entity;
wherein,
the device is configured to limit the number of times the encryption key is allowed to be retrieved from the first memory to a pre-determined threshold.

According to a fourth aspect, the present invention provides a system for encrypted communication between entities, the system comprising:
a device with an encryption key stored in memory;
an external entity with identity data for transmission to the device to initiate communication such that in response the device applies a one way function to the encryption key and the identity data to generate a variant key used to authenticate communications between the device and the external entity;
wherein, the device is configured to limit the number of times the encryption key is retrieved from the first memory in a given period of time.

Preferably the encryption key is a base key and the first memory is a non-volatile memory.

Preferably the identity data is a unique identifier that identifies the external entity to the exclusion of all other external entities such that the variant key generates a digital signature to authenticate communications between the device and the external entity only.

Preferably the device further comprises a second memory for a plurality variant keys generated for digital signatures to authenticate communication with a plurality of external entities respectively.

Preferably the second memory is a rewritable memory for storing a predetermined number of the variant keys, the predetermined number of variant keys being less than the threshold number of times that the base key can be retrieved from the non-volatile memory.

Preferably the generation of each of the variant keys using the one-way function includes adding several separate terms, and the device is configured to use random arrangements of the terms.

Preferably the generation of each of the variant keys using the one-way function includes adding several separate terms, and the device is configured to provide an arrangement of the terms that differs from other like devices.

Preferably the one-way function used to generate the variant keys includes adding several separate terms together, the device being configured to add a masking number as an additional term to the one way function, and subsequently subtract the masking number from the sum of the calculation.

Preferably the masking number is randomly generated for the generation of each of the variant keys.

Preferably the base key can be retrieved only for generating a variant key.

Preferably the device stores resource data wherein the external entity has certain permissions in relation to operations on the resource data.

Preferably the resource data represents a physical property.

Preferably the physical property is a remaining amount of a physical resource.

Preferably the operations include a read operation in which the resource data is read by the first external entity.

Preferably the operations include a write operation, in which the resource data is modified by the entity making the request.

Preferably the write operation is decrementing the resource data as an indication of consumption of the physical resource.

Preferably the one way function is a hash function.

Preferably the hash function is SHA1.

Preferably the device is incorporated into an ink cartridge.

Preferably the external entity is a print engine controller (PEC) in an inkjet printer configured for use with the ink cartridge.

According to a fifth aspect, the present invention provides a method of encrypted communication between entities, the method comprising the steps of:

providing a device with an encryption key stored in memory;

providing an external entity with identity data for transmission to the device;

applying a one way function to the encryption key and the identity data to generate a variant key;

authenticating communications between the device and the external entity with the variant key; and, limiting the number of times the encryption key is retrieved from the first memory to a pre-determined threshold.

According to a sixth aspect, the present invention provides a method of encrypted communication between entities, the method comprising the steps of:

providing a device with an encryption key stored in memory;

providing an external entity with identity data for transmission to the device;

applying a one way function to the encryption key and the identity data to generate a variant key;

authenticating communications between the device and the external entity with the variant key; and, limiting the number of times the encryption key is retrieved from the first memory in a given period of time.

Preferably the encryption key is a base key and the first memory is a non-volatile memory.

Preferably the identity data is a unique identifier that identifies the external entity to the exclusion of all other external entities and the step of authenticating communications comprises generating a digital signature with the variant key for attachment to communications between the device and the external entity only.

Preferably the method further comprises the step of providing a second memory in the device for a plurality variant keys generated for digital signatures to authenticate communication with a plurality of external entities respectively.

Preferably the second memory is a rewritable memory for storing a predetermined number of the variant keys, the predetermined number of variant keys being less than the threshold number of times that the base key can be retrieved from the non-volatile memory.

Preferably the step of generating each of the variant keys using the one-way function includes an adding several separate terms, and the device is configured to use random arrangements of the terms.

Preferably the step of generating each of the variant keys using the one-way function includes adding several separate terms, and the device is configured to provide an arrangement of the terms that differs from other like devices.

Preferably the one-way function used to generate the variant keys includes adding several separate terms together, the device being configured to add a masking number as an additional term to the one way function, and subsequently subtract the masking number from the sum of the calculation.

Preferably the masking number is randomly generated for the generation of each of the variant keys.

Preferably the base key can be retrieved only for generating a variant key.

Preferably the method further comprises the step of storing resource data in the device and providing the external entity with certain permissions in relation to operations on the resource data. Preferably the resource data represents a physical property. Preferably the physical property is a remaining amount of a physical resource. Preferably one of the permissions is a read operation in which the resource data is read by the external entity. Preferably the operations include a write operation, in which the resource data is modified by the entity making the request. Preferably the write operation is decrementing the resource data as an indication of consumption of the physical resource.

Preferably the one way function is a hash function. Preferably the hash function is SHA1.

Preferably the method further comprises the step of incorporating the device into an ink cartridge. Preferably the external entity is a print engine controller (PEC) in an inkjet printer configured for use with the ink cartridge.

BRIEF DESCRIPTION OF THE DRAWINGS

Preferred embodiments of the invention will now be described by way of example only with reference to the accompanying drawings, in which.

DETAILED DESCRIPTION OF THE PREFERRED EMBODIMENTS

Particular embodiments of the invention will now be described with reference to the Applicant's Memjet™ printing system. However, the skilled worker will understand that the invention is not restricted to use in a printing system and may be employed in a wide range of applications requiring encrypted communication and authentication of related entities.

Side Channel Behaviour of Prior Art QA Chip

The invention builds on the key management mechanisms presented in U.S. Pat. No. 7,557,941 cross referenced above and therefore adheres to the same terminology. Each ink cartridge in a Memjet™ Printer contains a QA (Quality Assurance) Chip that stores and uses a valuable base key to authenticate itself to software running in the Print Engine Controller (SOPEC) chip. Compromise of this key would allow an attacker to build clone ink cartridges that are accepted by any printer of the appropriate model.

The prior art or unimproved QA Chip will, in response to an attacker's command, retrieve a base key and use it for the following purposes:

to check the signature of an incoming command;
to sign some data requested in an authenticated read;
to form a variant key (see U.S. Pat. No. 7,557,941).

There is effectively no limit on the number of times that an attacker can ask for these commands to be processed.

Side-channel analysis attacks can repeatedly observe QA Chip outputs such as power consumption, emitted light, and emitted radio frequency emissions during the use of the base key and potentially deduce the key value. These QA Chip outputs are not intended by the designer as outputs, but they can often be used by an attacker.

Differential Power Analysis Attacks on the QA Chip

The following observations relate to one of the possible side-channel attacks on the unimproved QA Chip—Differential Power Analysis (DPA). This is a typical sequence of steps that would be used to attack the QA Chip with DPA.

Figure 1A:
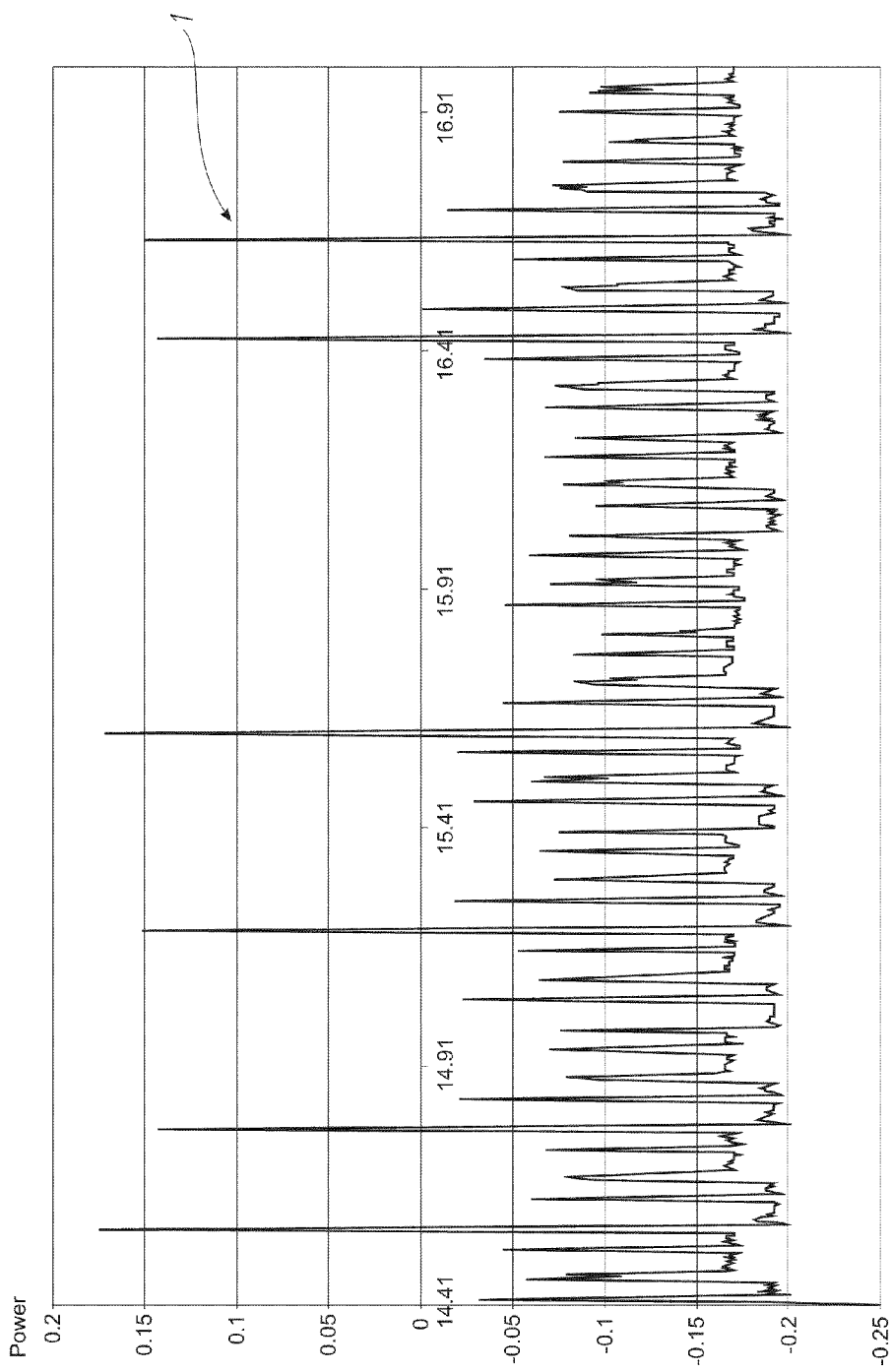
FIG. 1A is a sample QA chip power trace.

1. The first step in a differential power analysis attack is to record the power consumption of the attacked QA Chip while it processes many known, different data values, probably input values. In this step, the attacker gets measured power consumption values, which depend at least partially on the used secret key. The attacker needs to capture say 1000 power traces at the beginning. FIG. 1A shows a sample power trace 1 of an unimproved QA chip.

2. Then, with the known data values and a guess for a part of the secret key (e.g. 4 bits of it), the power consumption values are partitioned into two groups according to whether some intermediately computed value is expected to cause the QA Chip to consume more power or less power. The intermediately computed value is typically bits of the QA Chip accumulator, following a logical or arithmetic instruction involving the selected part of the secret key and other data known to the attacker.

Figure 1B:
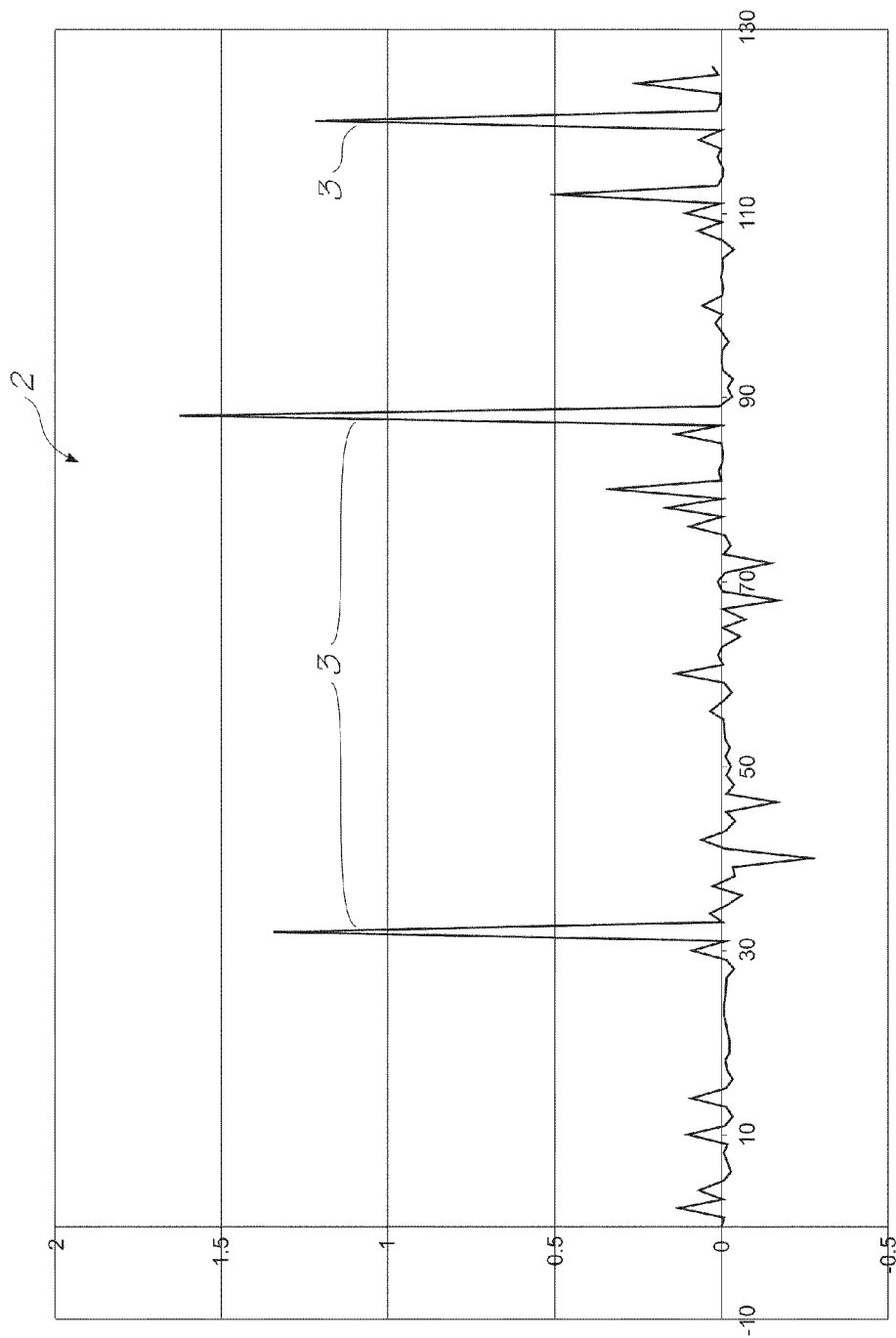
FIG. 1B is a covariance plot revealing data dependent power spikes.

3. Each partition above forms a hypothesis for some guess of part of the secret key. The hypothesis is tested to see if it is correct by statistical measures that analyse the difference of average power consumption between the two partitions. For the correct key guess, the statistical measure should reveal a "spike", and for the incorrect key guess, the measure should be flat. FIG. 1B shows the covariance plot 2 which reveals the data dependent power spikes 3.

4. The attacker then simply continues the attack in the same way for the other parts of the secret key.

More complex attacks are also possible, and these could reduce the required number of power consumption traces.

For an authenticated read command (see U.S. Pat. No. 7,557,941), the attacker can control the following things to help produce useful DPA results during the HMAC-SHA1 operation:

checker's nonce "RC" (160 bits)
field selection to be read (the field selection is potentially large)
field values (by decrementing or writing to them first).

This amounts to a large amount of attacker control, almost certainly sufficient to produce useful DPA results for a 160 bit base key. During the generation of a variant key from a base key (see U.S. Pat. No. 7,557,941), the attacker can control the checker QA Device identifier ChipID (64 bits) to help produce useful DPA results during the SHA-1 operation.

An informed attacker would probably ask the Ink Cartridge QA Chip to sign authenticated read values with the base key, because the base ink access key is much more valuable than a variant key.

Typical Use Profiles for the Ink Cartridge QA Chip

From knowledge of typical printer use cases, there is a high probability that the following parameters will be true for the ink cartridge QA Chip.

1. A single-use ink cartridge will operate in a few printers at most.
2. A refillable ink cartridge need only work in say 10 different printers over the life of the cartridge, or a few printers for each refill. This assumes that ink cartridges will only be refilled say 5 times due to mechanical wear and tear.

The Basic Side-Channel Defence—Variant Key Caching

The side-channel defence introduces caching of generated variant keys, and to constrain the ink cartridge QA Chip in three ways:

1. Only allow a small number of variant keys to be generated over the life of the QA Chip. This means that the valuable base key is only accessed a few times over the whole life of each ink cartridge QA Chip. Once a variant key has been calculated, it is cached for later use.
2. Restrict the ink cartridge QA Chip to only generate or check signatures based on variant keys.

3. Restrict the number of times that the batch keys present in an unconfigured QA chip can be used, and therefore prevent a DPA attack on these keys. Batch keys are described in more detail below.

Figure 2:
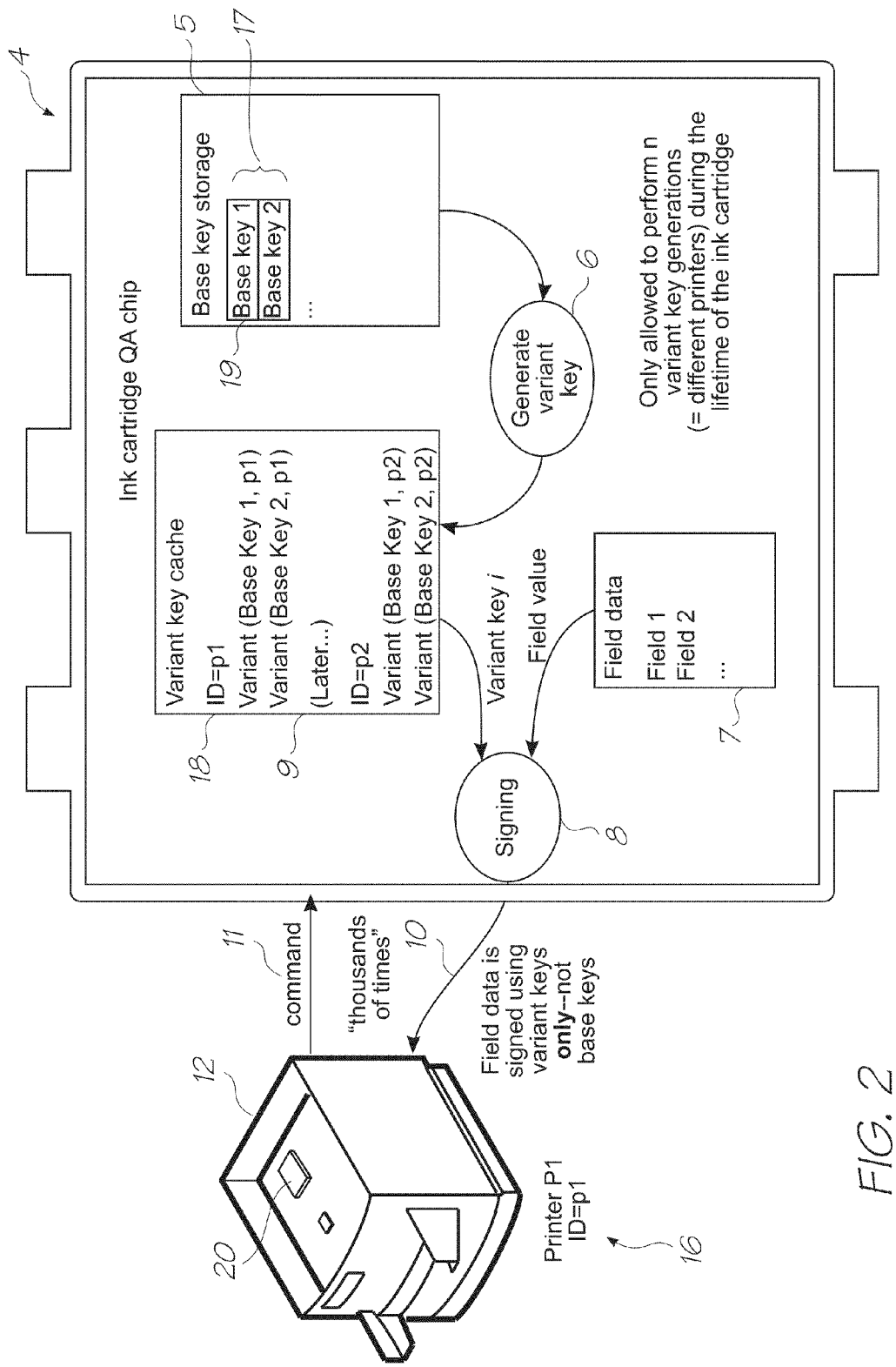
FIG. 2 is a system diagram of the encrypted communication between the printer and the QA chip.
Figure 5:
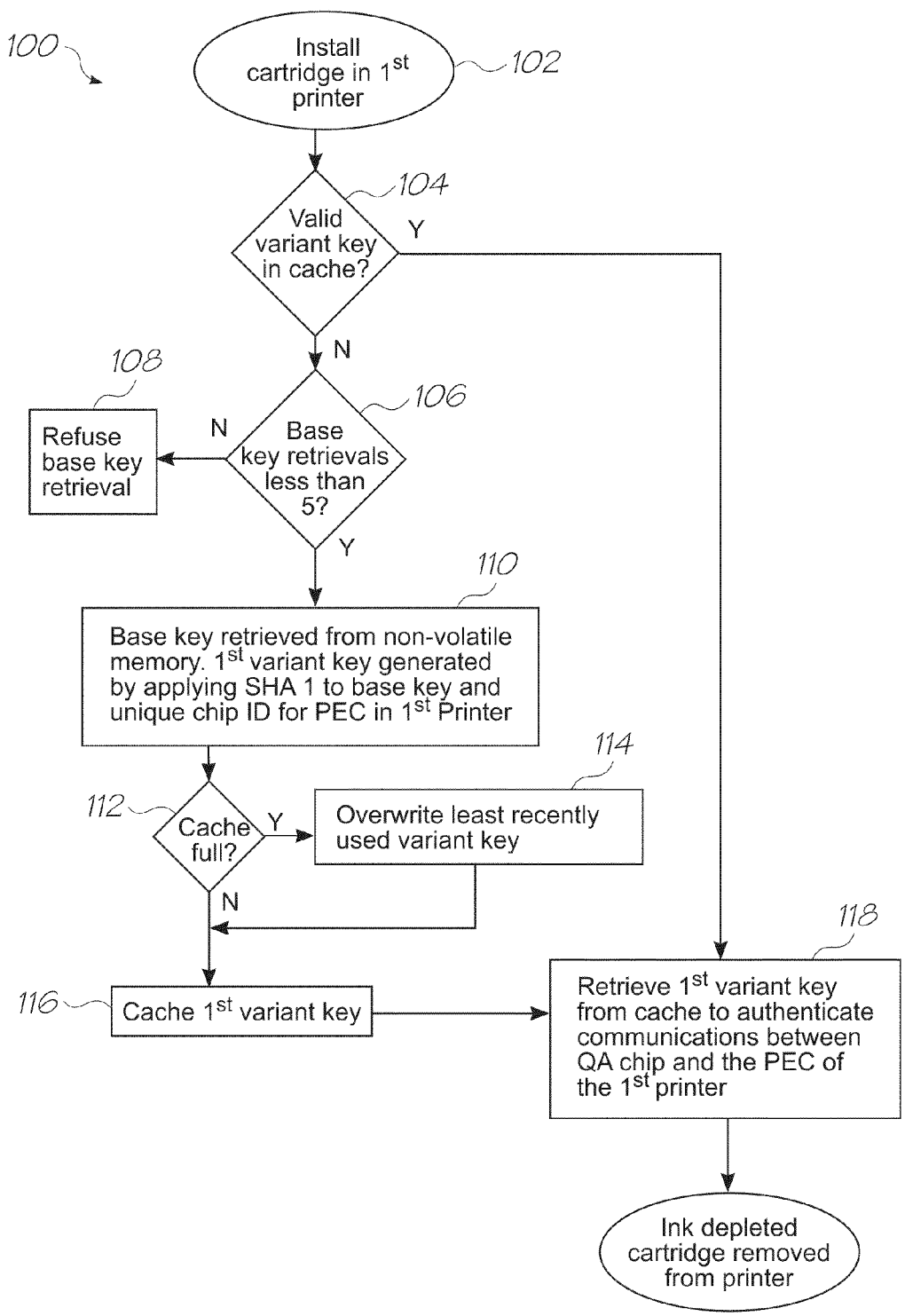
FIG. 5 is a flowchart of the method steps involved in the system shown in FIG. 2.

FIG. 2 diagrammatically illustrates the communication between a first printer 12 and the QA chip 4 during normal use. FIG. 5 is a flowchart 100 showing the steps followed by the first printer 12 and the cartridge 13 to authenticate communications between the two. Firstly, the cartridge 13 is installed in the first printer 12 (step 102). The first printer asks for a valid key and the QA chip 4 checks for one in the cache 9 (step 104). If no variant key is cached, the QA chip 4 checks the number of times the base key 17 has been retrieved (step 106), or alternatively, the number of base key retrievals within a certain period of time. If the number of base key retrievals exceeds the maximum—in this case five—base key retrieval is refused (step 108) and the cartridge can not be used with the printer 12.

To authenticate itself to the first printer 12, the QA chip 4 retrieves the base key 17 stored in non-volatile memory 5. Using a one way function 6 such as SHA1, a first variant key 18 is generated using the base key 17, and unique information from the first printer 12 such as the chip ID 16 identifying the printer's PEC 20 (step 110). The first variant key 18 is stored in cache memory 9 (step 116) and used to digitally sign 8 and authenticate data such as field data 7 transmitted to the first printer 12 (step 118). The digital signature 8 generated with the first variant key 18 will only be validated by the first printer 12. Communications with other printers will require the generation of further digital signatures based on those printer's unique ID's.

In the event that the cache memory 9 is full (step 112), the cached key that has not be used for longest period of time is overwritten in favour of the newly generated variant key (step 114).

Commands 11 from the first printer 12 are likewise validated by the QA chip 4 so that field data 7 such as virtual ink supplies can be read and decremented during operation with the printer. All authentication between the first printer 12 and the QA chip 4 being based on the first variant key 18 such that the base key 17 is retrieved once only.

Figure 3:
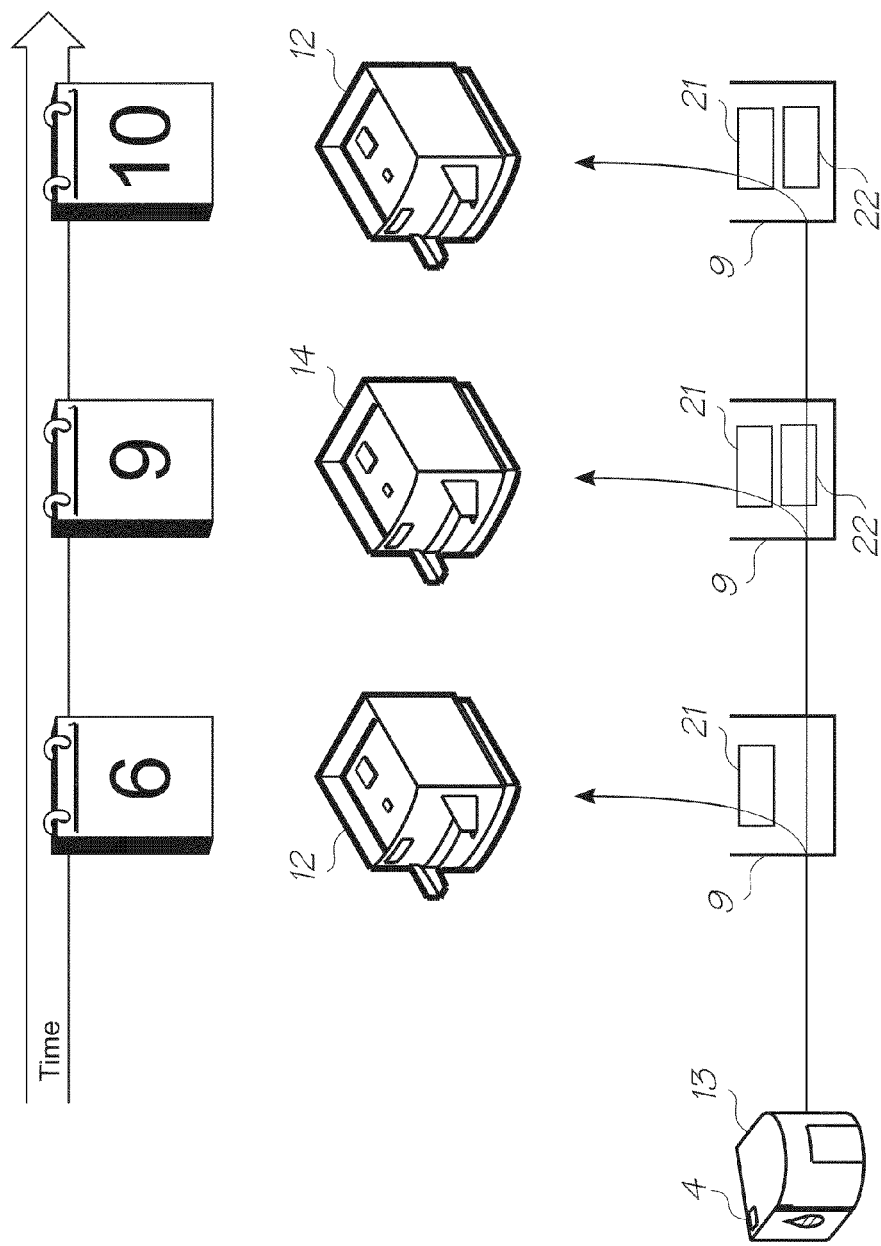
FIG. 3 is a system diagram of a typical use scenario of an ink cartridge with a QA chip according to the invention.
Figure 6:
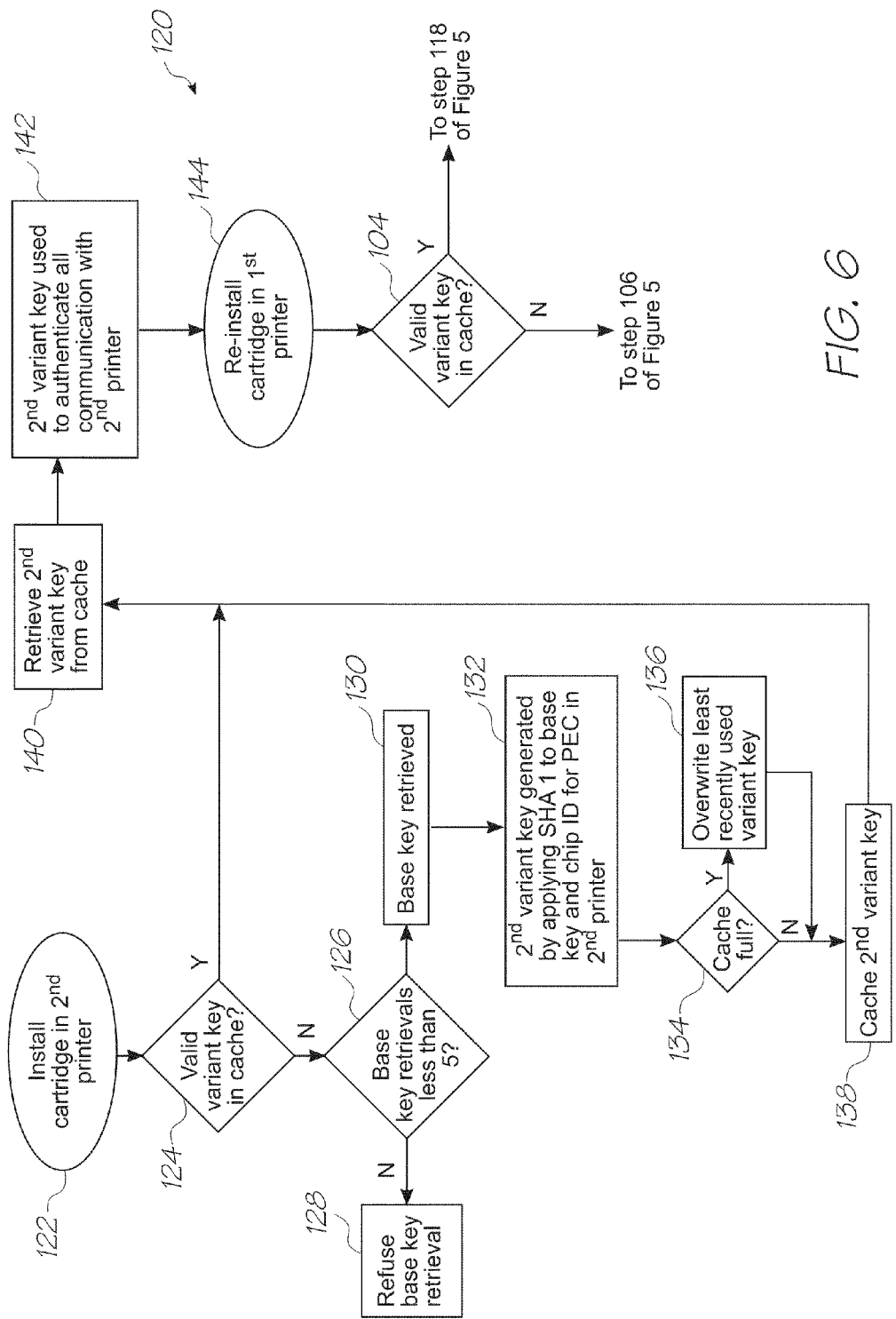
FIG. 6 is a flowchart of the method steps involved in the system shown in FIG. 3; and, FIG. 7 is a flowchart of the method steps involved in the system shown in FIG. 4.

The side channel defence of the present invention is unlikely to interfere with legitimate uses of a cartridge 13. FIG. 3 shows a typical use scenario in which the QA chip 4 follows the steps set out in the flowchart 120 of FIG. 6. It is conceivable that a user would want to swap an ink cartridge 13 out of a first printer 12 and into a second printer 14 (step 122). Initially the QA chip 4 in the cartridge 13 has permission to retrieve a base key a maximum of five times. When installed in the first printer 12 on the 6$^{th}$ of the month (step 102 of FIG. 5), the QA chip 4 in the cartridge 13 authenticates itself by retrieving the base key 17, the first printer ID 16 and generating a first variant key 21. This uses up one of the base key retrieval permissions which now reduce to four. The variant key 21 is stored in cache memory 9 and used for digitally signing data sent to the first printer 12 (as per the basic usage scenario described in FIGS. 2 and 5).

On the 9$^{th}$ of the month, the user removes the cartridge 13 from the first printer 12 and installs it into the second printer 14 (step 122). The second printer 14 has a different ID so it does not validate digital signatures generated using the first variant key 21 (step 124). The number of base key retrievals is less than five (step 126) so retrieval of the base key 17 is permitted (step 130). A new variant key 22 is generated using the base key and the unique ID of the second printer 14 (step 132). Retrieving the base key uses another of the five retrieval permissions which now drops to three. However, the cache memory 9 now stores both the first variant key 21 and the second variant key 22 (steps 134 and 138).

The communication between the second printer 14 and the QA chip 4 is authenticated by retrieving the second variant key (step 140) to digitally sign transmitted data (step 142).

On the 10$^{th}$ of the month, the user returns the cartridge 13 to the first printer 12 (step 144). As the first variant key 21 is still cached (step 104), the base key does not need to be retrieved and the number of base key retrieval permissions remains at three. The first variant key 21 is still able to generate digital signatures that the first printer 12 will validate (step 118 of FIG. 5).

Figure 4:
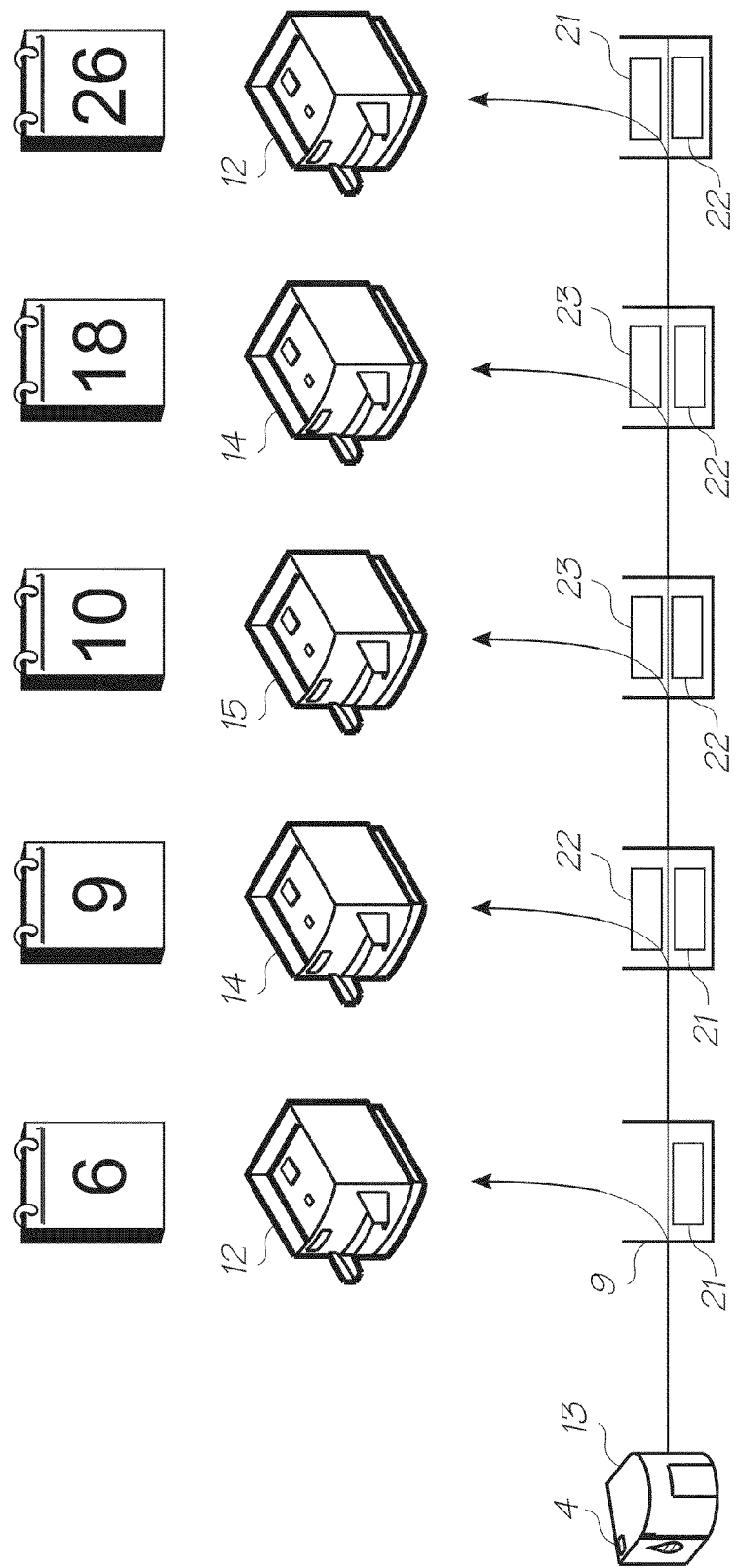
FIG. 4 is a system diagram of a more complicated use scenario.
Figure 7:
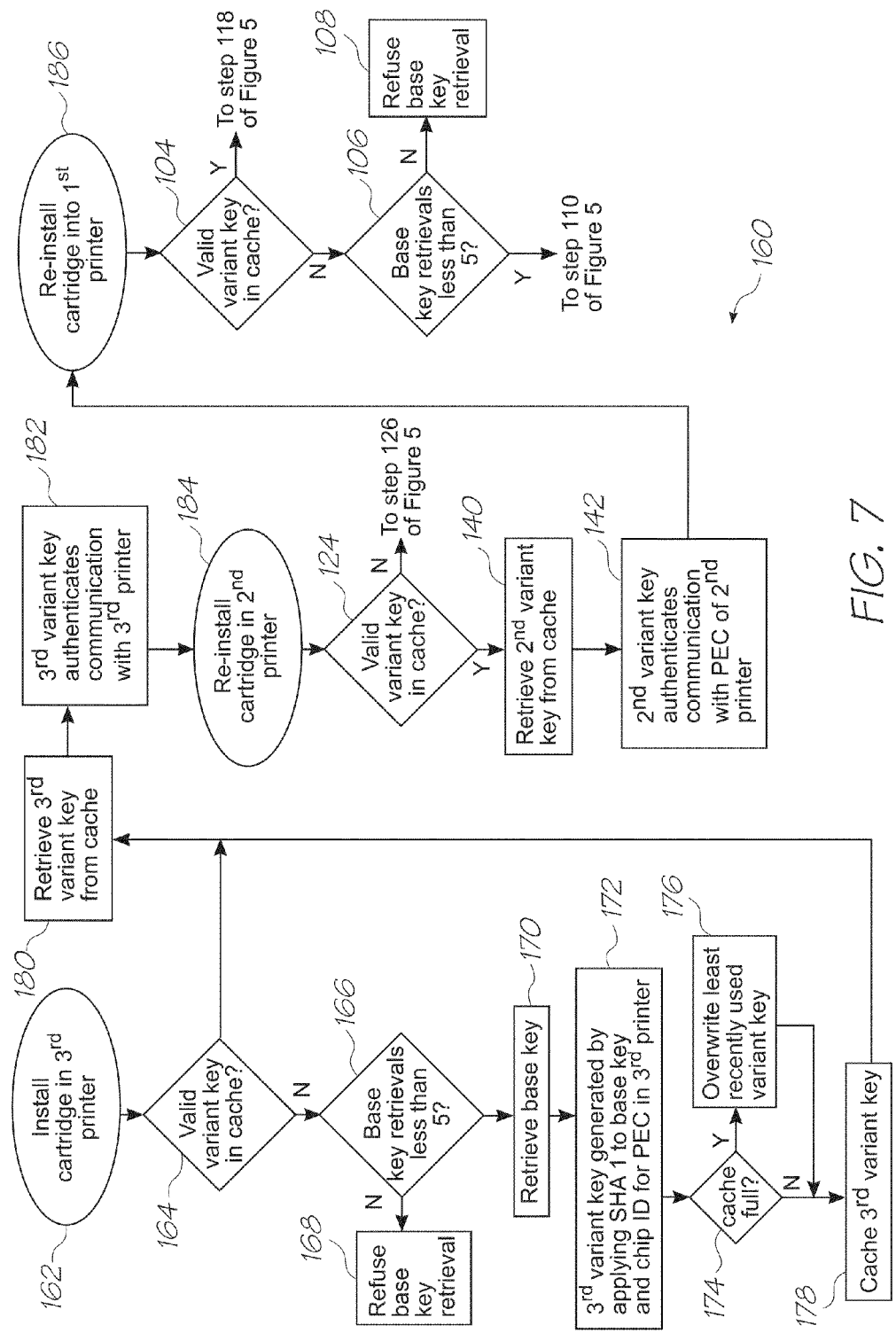

FIGS. 4 and 7 depict a more complicated use scenario that is relatively unlikely but still conceivable. In this case, the user installs the cartridge in a third printer 15 on the 10$^{th}$ of the month (step 162). The cartridge 13 has not previously been installed in the third printer 15, so a suitable variant key does not exist (step 164). To generate a third variant key 23, the base key 17 is once again retrieved and the number of remaining base key retrieval permissions reduces to two (steps 166 and 170). The third variant key 23 is generated (step 172) by applying the hash function to the base key 17 and the chip ID for the third printer 15. As the cache 9 only has capacity to store two variant keys (step 174), the least recently used key—the first variant key 21—is overwritten (step 176) and the third variant key 23 is cached (step 178). The cartridge 13 is used in the third printer 15 for eight days using the third variant key 23 to authenticate communications (steps 180 and 182).

On the 18$^{th}$ of the month, the user yet again installs the cartridge 13 in the second printer 14 (step 184). Fortunately, the second variant key 22 is still cached (step 124) and so the number of base key retrieval permissions remains at two. Usage proceeds in accordance with step 142 of flowchart 120 in FIG. 6. However, on the 26$^{th}$ of the month, the cartridge 13 is returned to the first printer 12 (step 186) and as the first variant key 21 was overwritten to cache the third variant key 23 (step 104 of flowchart 100 in FIG. 5), the base key 17 must be retrieved to again generate the first variant key 21. The QA chip proceeds according to the steps 106 onwards shown in flowchart 100. In this instance, the third variant key 23 is now the least recently used variant key in the cache 9 and so it is overwritten in favour of the first variant key 21 (steps 112 and 114). This leaves the cartridge 13 with only one remaining base key retrieval permission. However, after multiple uses in three different printers, it is unlikely that the cartridge 13 has much, if any ink left.

If the ink capacity is high or the cartridge is refillable, the QA chip can be configured to limit the rate that the base key retrieved from the non-volatile memory. For example, the maximum number of retrievals may apply to a predetermine period only (say each calendar day), after which, any used retrieval permissions are 're-credited' for the next predetermined period.

An attacker can potentially conduct DPA attacks on the small number of generated variant ink access keys using a single ink cartridge, but this would only compromise a small number of printers. Furthermore, if the required variant keys are present in less secure parts of the system, an attacker would probably attack elsewhere in preference to the QA Chip.

For an attacker to conduct a DPA attack on a valuable base key, they will need to collect power consumption waveforms from many ink cartridges. For example, assuming 1000 compatible power consumption waveforms are required to complete a DPA attack, and each ink cartridge is allowed to generate 3 variant keys for each base key, then the attacker would need at least 333 ink cartridges.

It will be appreciated that the invention does not prevent DPA attacks. The goal is to make DPA too burdensome or economically unappealing for potential attackers.

In summary, the improved QA Chip can still generate an effectively unlimited number of useful signatures as required in a printer system, but with a significantly lower vulnerability to DPA attacks.

Batch Keys and Configuration

Batch keys are placed into QA Chips when the chips are tested, to help secure the later configuration process. Before configuration, the QA Chips are generic, and can be used to make printer components of different brands and models.

The configuration process securely loads into a QA Chip the cryptographic keys and fields required for a particular printer component, e.g. a Brand X cyan ink cartridge. Batch keys are used to encrypt all other keys in their transport to the QA chip during configuration. The configuration process usually takes place in the physically secure printer component factory.

It is necessary to prevent the compromise of a batch key because this could lead to compromise of one or more base keys. Batch keys are variant keys, so DPA attacks cannot combine power waveforms from multiple QA Chips.

Variant Key Generation and SHA1

Variant keys are created by feeding the 160-bit base key and the 64-bit QA Device identifier ChipID into the well-known SHA1 secure hash algorithm. SHA1 secure hash algorithm is well known and widely used. A detailed explanation of the operation of this algorithm is provided by Wikipedia contributors, SHA hash functions, accessed 7 Aug. 2009 (see http://en.wikipedia.org/wiki/SHA_hash_functions)

Static Arrangement of Terms

The improved QA Chip can incorporate random arrangements of the terms of SHA1 calculations when performing variant key generation. This would make it harder for an attacker to combine multiple power consumption waveforms to reduce noise.

A first implementation is for an individual QA Chip to have a static arrangement of terms for each SHA1 calculation. In other words, an individual QA Chip would not change the order of its terms over time. Each QA Chip would have one of several possible arrangements of terms for each SHA1 calculation. The term arrangements would be selected randomly when the chip is programmed with the QA Chip application. Given the variant key generation limitations, this simple approach should still provide a useful benefit, because it should force the attacker to acquire a larger number of ink cartridges to successfully attack a base key.

As an example of the implementation of this improvement, consider the calculation of a state word A in the manner set out in http://en.wikipedia.org/wiki/SHA_hash_functions.

$$temp=(a\ leftrotate\ 5)+f+e+k+w[i]$$

(Note that temp is later assigned to a.)

This equation involves the addition of 5 terms. These additions could be done in any of 120 different orders and still get the same arithmetic result. However, each individual QA Chip would only add these terms in a fixed order.

A bigger problem with this example from the defender's perspective is that the attacker would know that only 'a' is being left-rotated. To address this, the improved QA Chip can perform a number of left-rotates of other data that varies with different inputs, and rearrange the order of these left-rotates in different chips.

The SHA1 implementation used for unlimited operations, such as HMAC-SHA1 signing using variant keys, should be different so it cannot be easily studied by an attacker to learn about the SHA1 implementation used for variant key generation. Therefore an improved QA Chip employing static term arrangement must have two different implementations of SHA1 within it.

Addition of Static Masking Operations

The addition of masking operations involves:
the insertion of a set of mask numbers, unpredictable for an attacker, into each instance of an improved QA Chip—note that these numbers do not change once programmed into an individual QA Chip;
the modification of cryptographic calculations in the QA Chip to use these unpredictable numbers to change power consumption waveforms in a manner that changes power consumption waveforms but does not affect the final cryptographic result;

For example, if the cryptographic operation involves adding a set of terms:

$$temp=(a\ leftrotate\ 5)+f+e+k+w[i]$$

... then the addition of simple masking operations may be (for example):
adding one of the unpredictable mask numbers m to the first term;
completing the additions as per the standard algorithm; and finally;
subtracting m from the final sum.

In other words, assuming left-to-right additions, the equation is modified to:

$$temp=m+(a\ leftrotate\ 5)+f+e+k+w[i]-m$$

Similar approaches can be used for the other calculations involved in the SHA1 operation used to calculate a variant key. For example, masking techniques for nonlinear bitwise Boolean operations such as in:

$$f=(b\ and\ c)\ or\ ((not\ b)\ and\ d)$$

The power consumed in a CMOS arithmetic logic unit (ALU) depends on the number of changed bits rather than the operation result, so the ALU power consumption waveform for each chip will be different, even though the calculated results are the same. This will make it harder for an attacker to usefully combine the ALU power consumption waveforms from multiple chips to perform a DPA attack on a base key.

One advantage of masking over term re-arrangement is that the number of QA Chips with different power consumption waveforms would be very large. The number of possible rearrangements of terms is relatively small.

Masking usually involves the use of a source of random data within one chip to provide a dynamic mask value. A dynamic mask value should not be required for the improved QA Chip because only a small number of power consumption waveforms can be obtained from each QA Chip.

Addition of Dynamic Term Arrangement

In some circumstances, there may be benefits for DPA defence in dynamic term arrangement, meaning that the improved QA Chip randomly arranges the order of calculation of terms for each successive variant key generation in a single chip.

The benefits are most relevant if the allowed number of variant key generations is necessarily high because of the particular circumstances in which the QA Chip is being applied, or if the other constraints listed in http://en.wikipedia.org/wiki/SHA_hash_functions cannot be enforced.

Addition of Dynamic Masking Operations

One dynamic masking operation involves the improved QA Chip randomly generating masking values 'm' for each successive variant key generation in a single chip. The masking values would be applied as described for the addition of static masking operations. As with dynamic term arrangement (described above), the benefits are most relevant when the allowed number of variant key generations is relatively high in order to provide sufficient flexibility for some application, or if the other constraints listed in http://en.wikipedia.org/wiki/SHA_hash_functions cannot be enforced.

Masking can potentially be defeated by higher order DPA attacks. Since higher order DPA attacks require more power consumption waveforms than basic DPA attacks, dynamic masking can still be of some advantage.

Additional Benefits of the Defences

While the described defences improve resistance to a range of side-channel attacks, they also reduce the QA Chips vulnerability to a range of other physical attacks such as focused ion beam chip modifications. This is because if the base key value only moves from the non-volatile memory cell into other circuitry very few times over the life of the ink cartridge, then very little key information can practically be obtained for each difficult chip modification/probing. It is very difficult to directly measure the electrical charge on a tiny non-volatile memory cell containing a key bit unless it is read from the memory.

Additional Command for Setting QA Device Identifier

An additional set_QA_Device_ID command can be added to make the use of base keys more explicit. This command would:
- communicate the appropriate QA Chip identifier for the checking device, for a selected base key or set of base keys;
- cause the calculation of one or a set of variant keys; and
- cause the caching of the variant key(s) for later use.

Restricting Variant Key Generations with a Virtual Consumable

The number of variant key generations allowed in the improved QA Chip can be restricted by using a virtual consumable (VC). A virtual consumable is a QA Chip field that indicates the remaining amount of some resource, and which is securely decremented during printer operation as the resource is consumed.

This approach has the following advantages:
- an authorised refill machine refills the number of allowed variant key generations in the same way that it refills virtual ink;
- the QA Chip does not need to be restricted to a predetermined maximum number of variant key generations required over many refills.

The invention has been described herein by way of example only. Ordinary workers in this field will readily recognise many variations and modification which do not depart from the spirit and scope of the broad inventive concept.

The invention claimed is:

1. A device for encrypted communication with a first external identity, the device comprising:
    a first non-volatile memory;
    a base key stored in the first memory; and,
    a one-way function for application to the base key, the device being configured to generate a variant key based on the one-way function, the base key and information from the first external entity;
    a second rewritable memory having a maximum capacity suitable for storing only a predetermined number of variant keys,
    wherein during use,
    the device is configured to limit the number of times the base key is allowed to be retrieved from the first memory to a predetermined threshold; and
    the predetermined number of variant keys storable in the maximum capacity of the second rewritable memory is less than the predetermined threshold number of times that the base key can be retrieved from the first non-volatile memory.

2. A device according to claim 1 wherein the information from the first external entity is a unique identifier such that the first variant key generated by applying the one way function to the base key and the unique identifier authenticates communication between the device and the first external entity only.

3. A device according to claim 1 wherein the generation of each of the variant keys using the one-way function includes adding several separate terms, and the device is configured to use random arrangements of the terms.

4. A device according to claim 1 wherein the generation of each of the variant keys using the one-way function includes adding several separate terms, and the device is configured to provide an arrangement of the terms that differs from other like devices.

5. A device according to claim 1 wherein the one-way function used to generate the variant keys includes adding several separate terms together, the device being configured to add a masking number as an additional term to the one way function, and subsequently subtract the masking number from the sum of the calculation.

6. A device according to claim 5 wherein the masking number is randomly generated for the generation of each of the variant keys.

7. A device according to claim 1 wherein the base key can be retrieved only for generating a variant key.

8. A device according to claim 1 further comprising resource data wherein the first external entity has certain permissions in relation to operations on the resource data.

9. A device according to claim 8 wherein the resource data represents a physical property.

10. A device according to claim 9 wherein the physical property is a remaining amount of a physical resource.

11. A device according to claim 10 wherein the operations includes a read operation in which the resource data is read by the first external entity.

12. A device according to claim 11 wherein the operations include a write operation, in which the resource data is modified by the entity making the request.

13. A device according to claim 12 wherein the write operation is decrementing the resource data as an indication of consumption of the physical resource.

14. A device according to claim 1 wherein the one way function is a hash function.

15. A device according to claim 14 wherein the hash function is SHA1.

16. A device according to claim 13 wherein the device is incorporated into an ink cartridge.

17. A device according to claim 16 wherein the entity is a print engine controller (PEC) in an inkjet printer configured for use with the ink cartridge.

* * * * *